United States Patent
Kaneko

Patent Number: 5,432,332
Date of Patent: Jul. 11, 1995

[54] METHOD OF AUTO-FOCUSSING AND SYSTEM THEREFOR

[75] Inventor: Kouji Kaneko, Omiya, Japan

[73] Assignee: Fuji Photo Optical Co., Ltd., Saitama, Japan

[21] Appl. No.: 51,095

[22] Filed: Apr. 22, 1993

[30] Foreign Application Priority Data

Apr. 28, 1992 [JP] Japan .................. 4-108290
Apr. 28, 1992 [JP] Japan .................. 4-108291

[51] Int. Cl.$^6$ ............................................. G02B 7/11
[52] U.S. Cl. .................. 250/201.7; 354/402; 348/354
[58] Field of Search .......... 250/201.2, 201.7; 354/402, 404, 405, 406, 407, 408; 348/349, 353, 354, 355, 356

[56] References Cited

U.S. PATENT DOCUMENTS

| | | | |
|---|---|---|---|
| 4,492,449 | 1/1985 | Oinoue et al. | 250/201.7 |
| 4,942,418 | 7/1990 | Norita et al. | 250/201.7 |
| 4,967,280 | 10/1990 | Takuma et al. | 348/355 |
| 5,151,609 | 9/1992 | Nakagama et al. | 250/201.7 |
| 5,225,940 | 7/1993 | Ishii et al. | 250/201.7 |
| 5,235,375 | 8/1993 | Yamana et al. | 250/201.1 |
| 5,264,890 | 11/1993 | Komiya | 348/355 |
| 5,319,462 | 6/1994 | Haruki et al. | 348/355 |
| 5,325,146 | 6/1994 | Toji | 348/356 |

FOREIGN PATENT DOCUMENTS 62-272217 11/1987 Japan.
62-272218 11/1987 Japan.

OTHER PUBLICATIONS

The Technical Journal of NHK (Japan Broadcasting Corporation) No. 1 (Ser. 86), vol. 17, "An Example of a Focus Value Curve" 1965 pp. 21-37.

The Technical Journal of Japan Broadcasting Corporation ED675, vol. 6, No. 29, "Auto Focus System by Detecting Edge Component of Video Signal" pp. 7-12. Nov. 29, 1982.

Primary Examiner—David C. Nelms
Assistant Examiner—John R. Lee
Attorney, Agent, or Firm—Birch, Stewart, Kolasch & Birch

[57] ABSTRACT

A novel method and apparatus for auto-focussing which includes determining a focus voltage $E_{S0}$ in a current position of a focus lens and focus voltages $E_{S+}$ and $E_{S-}$ when the focus lens is moved by a distance dx in both a front and rear direction along an optical axis, so that a focussing shift value is calculated more accurately and quick focussing is achieved. A distance $X_0$ from the current position of the focus lens to the focussing position is calculated based on the focus voltages $E_{S0}$, $E_{S+}$ and $E_{S-}$ according to:

$$X_0 = dx(R_+ - R_-) / 2(R_+ + R_-)$$

where $R_+ = LN(E_{S+}/E_{S0})$ $$R_- = LN(E_{S-}/E_{S0}).$$

With this arrangement, the distance $X_0$ can be determined without factors for determining curves of the focus voltages and the magnitude of the width of the differential.

35 Claims, 7 Drawing Sheets

METHOD OF AUTO-FOCUSSING AND SYSTEM THEREFOR

BACKGROUND OF THE INVENTION

1. Field of the Invention

This invention relates to a method of auto-focussing and a system therefor, and more particularly to a method of auto-focussing and a system therefor, wherein a high frequency component is extracted from image signals obtained from an image sensing element such as a charge coupled device (CCD) as a focus voltage and focussing is performed automatically in such a manner that the focus voltage attains the maximum level.

2. Description of the Related Art

There has heretofore been such an auto-focussing system wherein, based on the fact that the voltage level of a high frequency component of the image signals obtained by. photographing an object corresponds to the degree of precision of a picture image, the high frequency component from the image signals is extracted as a focus voltage and the focus lens is driven in such a manner that this focus voltage attains the maximum level, whereby the position of the lens is adjusted to the focussing position.

The auto-focussing system of this kind includes a type first, in which the focus voltages at two points are successively compared in level, whereby the presence of a shift in focussing and a moving direction of the lens are detected on the basis of the magnitudes of the focus voltages, so that the lens is moved, and a second type, in which a distance to a focussing position is calculated from a differential value of the focus voltage at an optional position and the lens is driven on the basis of the thus calculated value. The former is known as a mountain climbing servo type and described in detail in the NHK Technical Research Report 1965, volume 17, No. 1, the consecutive number of volumes No. 86, page 24, or the Television Society Technical Report ED No. 675, page 7 and so forth. Furthermore, the latter is described in Patent Application Laid-open No. 62-272217 and Patent Application Laid-Open No. 62-2722218 and so forth.

Now, in the case of the former i.e., the mountain climbing servo type, the inclinations of the focus voltages are successively detected, whereby the peak of the focus voltages (focussing position) is sought while the lens is being moved, thus presenting the disadvantage of taking a lot time before the focussing position is reached.

On the other hand, in the case of the latter, the differential is performed once or twice, whereby the width of differential affects the accuracy of calculation. The smaller the width of differential is, the better the accuracy of the calculation becomes, however, the smaller the width of differential is, the smaller the change in the focus voltage becomes, so that the detecting accuracy of the focus voltage is affected.

Furthermore, in the case of the latter, the high frequency component from the image signals is extracted as the focus voltage and the distance to the focussing position is calculated on the basis of this focus voltage. However, the result of the calculation is affected by the actual state of the object. Accordingly, depending on the result of the calculation based on the focus voltage obtained from one frequency component, there are cases where both the movements of the lens and the calculations of the distance to the focussing position after the movements of the lens must be repeated a multitude of times until the distance to the focussing position can enter the allowable circle of confusion.

SUMMARY OF THE INVENTION

It is the object of the present invention to provide a method of auto-focussing and a system therefore, wherein reliable and quick focussing can be performed by the adoption of the novel calculation and the estimation of an appropriate focussing shift value on the basis of the fuzzy inference.

To achieve the above-described object, according to the present invention, the method of auto-focussing wherein the object image is made to focus at the CCD through an optical system, the high frequency component is extracted from the image signals obtained by the CCD, the focus voltage is detected from the high frequency component thus extracted, a distance for a part of the optical system to move to the focussing position is calculated on the basis of the focus voltage thus detected, and the part of the optical system is moved by the calculated distance in the optical axis direction thereof, so that the focussing can be made at the object image. In this method, a first focus voltage $E_{S0}$ is detected when the part of optical system is disposed in an optional position, the part of optical system is moved by a minute distance dx in the front and the rear of the above-described optional position, a second focus voltage $E_{S+}$ and a third focus voltage $E_{S-}$ are respectively detected in the respective positions of movement, a distance $X_0$ from the above-described optional position to the focussing position is calculated on the basis of the first focus voltage $E_{S0}$, the second focus voltage $E_{S+}$ and the third focus voltage $E_{S-}$ in accordance with the following equation:

$$X_0 = dx(R_+ - R_-) / 2(R_+ + R_-)$$

where $R_+ = LN(E_{S+}/E_{S0})$ $R_- = LN(E_{S-}/E_{S0})$ and the part of optical system is moved by the calculated distance in the the optical axis direction thereof so that the focussing is made at the object image. Furthermore, in the method of auto-focussing the sign of $(R_+ + R_-)$ is discriminated before the calculation of the distance $X_0$, and, only when the sign is negative, is the distance $X_0$ is calculated.

Further, in the method of auto-focussing, the object image is made to focus at the CCD through the optical system, respective high frequency components for a plurality of high frequency zones which are different from one another are extracted from the image signals obtained from the CCD, a plurality of focus voltages are detected, respectively, from the thus extracted high frequency components, a plurality of distances for the part of the optical system to move to the respective focussing positions are calculated on the basis of the plurality of focus voltages, a plurality of adaptations are determined from the plurality of distances calculated as above and a membership characteristic function using the plurality of high frequency zones as parameters, a representative value of a set of the plurality of adaptations is calculated as a distance to the focussing position, and the part of optical system is moved by the distance indicated by the above-described representative value in the the optical axis direction thereof, so that the focussing is made at the image object.

According to the present invention, the focus voltage when the part of optional system is in the optical position is set at $E_{S0}$, the focus voltages when the part of optical system is moved by a minute distance dx in the front and the rear of the optical position are respectively set at $E_{S+}$ and $E_{S-}$, and the distance $X_0$ from the optional position to the focussing position is calculated on the basis of these focus voltages $E_{S0}$, $E_{S+}$ and $E_{S-}$ in accordance with the following equation:

$$X_0 = dx (R_+ - R_-) / 2 (R_+ + R_-)$$

where $R_+ = LN (E_{S+}/ E_{S0})$ $$R_- = LN (E_{S-}/ E_{S0})$$

With this arrangement, factors for determining the inclinations of the curves of the focus voltages can be sought and the distance $X_0$ can be satisfactorily sought without relying upon the magnitude of the width of the differential, thus enabling it to perform the focussing reliably and quickly. Furthermore, the sign of $(R_+ + R_-)$ is discriminated before the calculation of the distance and, only when $(R_+ + R_-) < 0$, the above-described distance is calculated. That is, this $(R_+ + R_-)$ constantly becomes negative when the measurement of the focus voltage is accurate, so that the respective focus voltages when $(R_+ + R_-) \geq 0$ are recognized as the harmful measured values and not adopted.

Further, according to another embodiment of the present invention, respective frequency components from all plural frequency zones different from one another are extracted from the image signals obtained from the CCD as the plurality of focus voltages, and the distances for the part of optical system to move to the respective focussing positions are calculated on the basis of the plurality of focus voltages. Then, a plurality of adaptations are determined from the plurality of distances and the membership characteristic function using the plurality of high frequency zones as parameters, and the representative value of the set of the plurality of adaptations is calculated as the distance to the focussing position. As described above, the distance to the focussing position is calculated and the part of the optical system is moved on the basis of the result of calculation in the the optical axis direction thereof, so that the focussing is made at the object image.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE INVENTION

A detailed description of the preferred embodiment of the method of auto-focussing and system of the present invention is set forth below with reference to the accompanying drawings.

Firstly, the principle of the method of auto-focussing according to the present invention will be described.

A high frequency component is extracted from image signals obtained from an image sensing element such as a CCD, a voltage (hereinafter referred to as a "focus voltage") obtained by detecting the high frequency component is made to be $E_s$ and, if a distance to a focussing position P of a focus lens is set at x, then the relationship between the focussing voltage $E_S$ and the distance x can be approximated according to the NHK Technical Research Report 1965, Volume 17, No. 1, the consecutive number of volumes No. 88, page 21, in accordance with the following equation:

$$E_S(x) = b \cdot exp \{-(ax)^2\} \tag{1}$$

where a: a coefficient for determining the inclination of the curve of the focus voltage $E_S$, b: a coefficient for determining the maximum value of the curve of the focus voltage $E_S$.

Figure 3A:
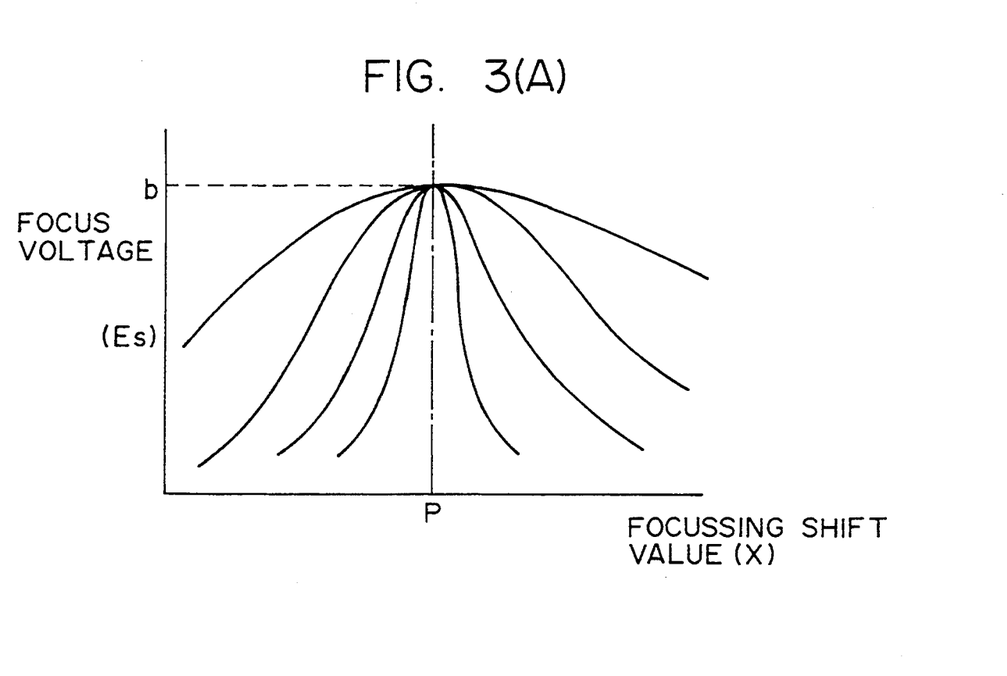
FIG. 3(A) is a graphic chart showing the characteristic curves of the respective focus voltages when the frequency component of the object image and the diaphram of the lens are changed.
Figure 3B:
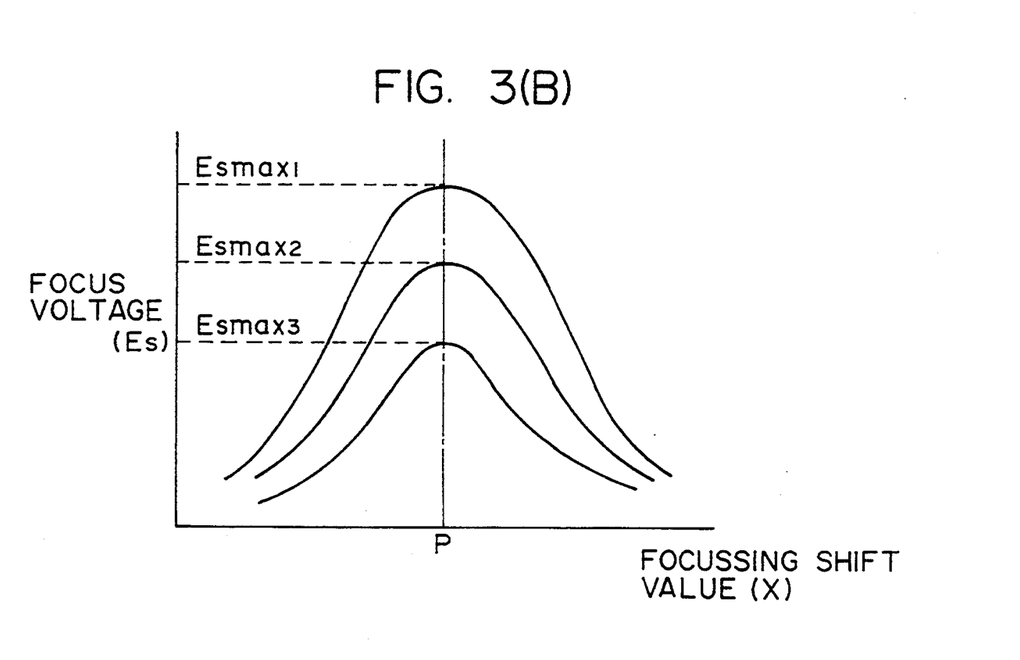
FIG. 3(B) is a graphic chart showing the characteristic curves of the respective focus voltages when the contrast of the object image, the gains of the amplifying system and the like are changed.

FIG. 3(A) shows the characteristic curves of the respective focus voltages when the above-described coefficient a is changed by the frequency component of the object image, the diaphragm of the lens and the like, and FIG. 3(B) shows the characteristic curves of the respective focus voltages when the above-described coefficient b is changed by the contrast of the object image, the gains of the amplifying system and the like.

Figure 4:
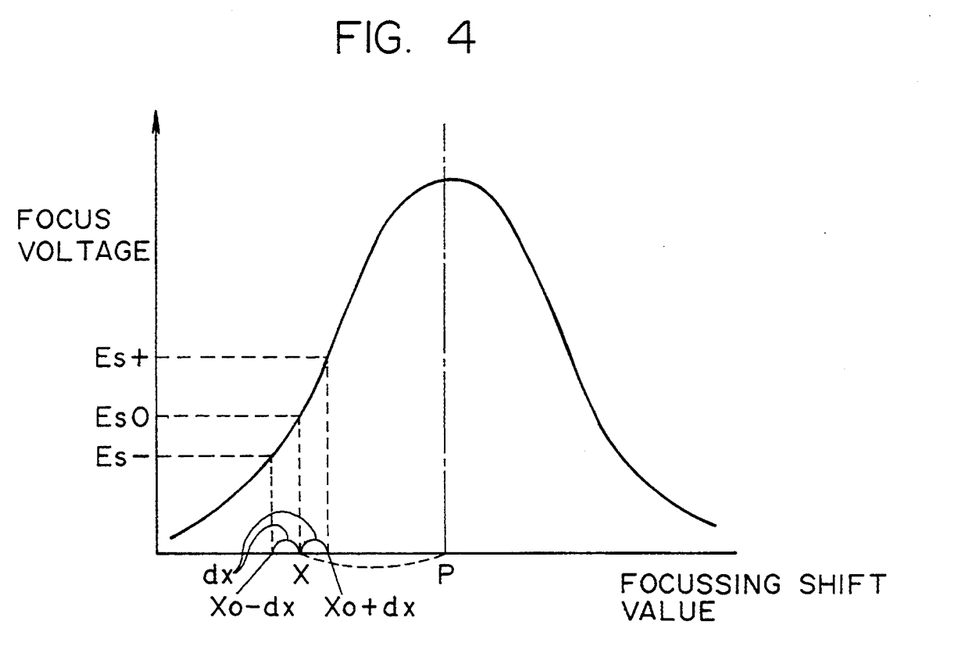
FIG. 4 is a graphic chart showing the characteristic curve of the focus voltage used for explaining the present invention in principle.

Now, according to the present invention, as shown in FIG. 4, if the focus voltage at the position of the distance $X_0$ apart from the focussing position P is made to be $E_{S0}$ and the focus voltages disposed at a position $(X_0+dx)$ and another position $(X_0-dx)$, which are spaced the minute distance dx in the front and the rear apart from the position $X_0$, are made to be $E_{S+}$ and $E_{S-}$, then $E_{S+}$, $E_{S0}$ and $E_{S-}$ can be represented by the above-described equation (1) as:

$$E_{S+} = b \cdot exp[-\{a(X_0+dx)\}^2] \tag{2}$$

$$E_{S0} 32 \ b \cdot exp\{-(aX_0)^2\} \tag{3}$$

$$E_{S-} = b \cdot exp[-\{a(X_0-dx)\}^2] \tag{4}$$

When the ratios of the focus voltages $E_{S+}$ and $E_{S-}$ to the focus voltage $E_{S0}$ are sought from the above-described equations (2)~(4), the following equations can be obtained:

$$E_{S+}/E_{S0} = exp\{-a^2 dx(2X_0+dx)\} \quad (5)$$

$$E_{S-}/E_{S0} = exp\{a^2 dx(2X_0-dx)\} \quad (6)$$

In the equations (5) and (6), when the natural logarithms of both sides of the equation are taken and set to $R_+$ and $R_{31}$, respectively, $R_+$ and $R_-$ become the following equations:

$$R_+ = LN(E_{S+}/E_{S0}) = -a^2 dx(2X_0+dx) \quad (7)$$

$$R_- = LN(E_{S-}/E_{S0}) = a^2 dx(2X_0-dx) \quad (8)$$

Then, when the sum and difference of $R_+$ and $R_-$ from the equations (7) and (8) are taken:

$$R_+ + R_- = -2\cdot(adx)^2 \quad (9)$$

$$R_+ - R_- = -4\cdot a^2 dx X_0 \quad (10)$$

Further, when the coefficient a is eliminated and equations (9) are solved for (10) and $X_0$, the following equation is obtained.

$$X_0 = dx(R_+ - R_-) / 2(R_+ + R_-) \quad (11)$$

Accordingly, the focus voltages $E_{S+}$, $E_{S0}$ and $E_{S-}$ are measured, $R_+$ and $R_-$ are calculated on the basis of the focus voltages $E_{S+}$, $E_{S0}$ and $E_{S-}$ from the equations (7) and (8) and these $R_+$ and $R_-$ are substituted into the equation (11), whereby the value of movement $X_0$ of the focus lens to the focussing position P can be calculated, so that the focus lens is driven on the basis of $X_0$ thus calculated to perform the focussing automatically.

Furthermore, as apparent from the above-described equation (9), $(R_+ + R_-)$ is always negative, however, depending on the measured value of the focus voltage, the calculated value of $(R_+ + R_-)$ may become positive. In this case, it is determined that there is an error in the measured value of the focus voltage, and, if the lens is not driven on the basis of such a measured value, then erroneous driving can be prevented, thus enabling it to make the focussing quicker.

Figure 1:
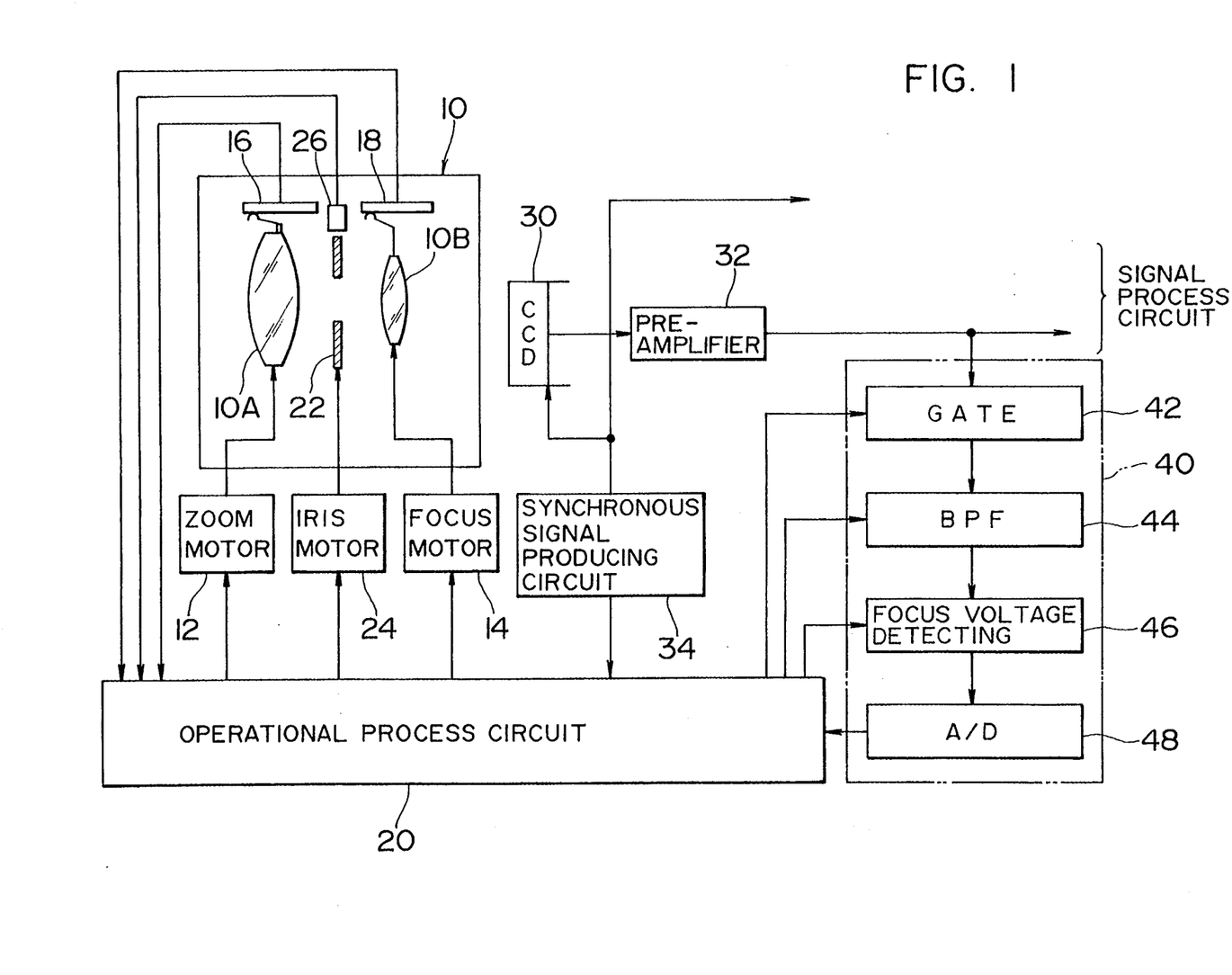
FIG. 1 is a block diagram showing an embodiment of an electronic camera provided with the system for auto-focussing according to the present invention.

FIG. 1 is the block diagram showing one embodiment of the electronic camera provided with the system for auto-focussing according to the present invention.

As shown in FIG. 1, a taking lens 10 is a zoom lens of rear focus type, having a front group lens 10A and a rear group lens 10B. These front group lens 10A and the rear group lens 10B are suitably moved by a zoom motor 12 and a focus motor 14, respectively, so that zooming and focussing can be performed. Incidentally, the positions of the front group lens 10A and the rear group lens 10B are detected by a zoom position detector 16 and a focus position detector 18, respectively, and these position data are applied to an operational process circuit 20. Furthermore, a diaphragm 22 is driven by an iris motor 24, and the position of diaphragm is detected by a diaphragm position detector 26.

Light from an object image is received into a light receiving surface of a CCD 30 through the above-described taking lens 10 and converted into image signals having signal charges corresponding to the intensity in respective sensors of the CCD 30. The image signals converted by the CCD 30 are successively read out, suitably amplified in a preamplifier 32, thereafter, applied to a signal process circuit, not shown, and applied to an auto focus (AF) circuit 40. Incidentally, the CCD 30 outputs the image signals for one field per predetermined sampling cycle (1/60 sec) in synchronism with a synchronous signal from a synchronous signal producing circuit 34, and the operational process circuit 20 also performs the operational process in synchronism with the above-described synchronous signal.

The AF circuit 40 is constituted by a gate circuit 42, a band pass filter (BPF) 44, a focus voltage detecting circuit 48 and an A/D converter 48.

The gate circuit 42 allows only the image signals within a predetermined measuring range out of the input image signals for one field to pass therethrough and, when signals showing the predetermined measuring range are input from the operational process circuit 20, the gate circuit 42 outputs the image signals only during the inputting. The. BPF 44 allows a predetermined high frequency component out of the input image signals to pass therethrough and outputs it to the focus voltage detecting circuit 46. Incidentally, the BPF 44 is constituted by a plurality of BPF'S different in filter characteristics from one another, and a suitable BPF can be selected by a
control signal from the operational process circuit 20.

The focus voltage detecting circuit 46 is formed by a detection circuit for example, and voltage signals obtained by detecting signals of the input high frequency component are output as the focus voltage as shown in FIG. 4. The focus voltage thus detected is converted into digital signals by the A/D converter 48, and thereafter, output into the operational process circuit 20.

Figure 2:
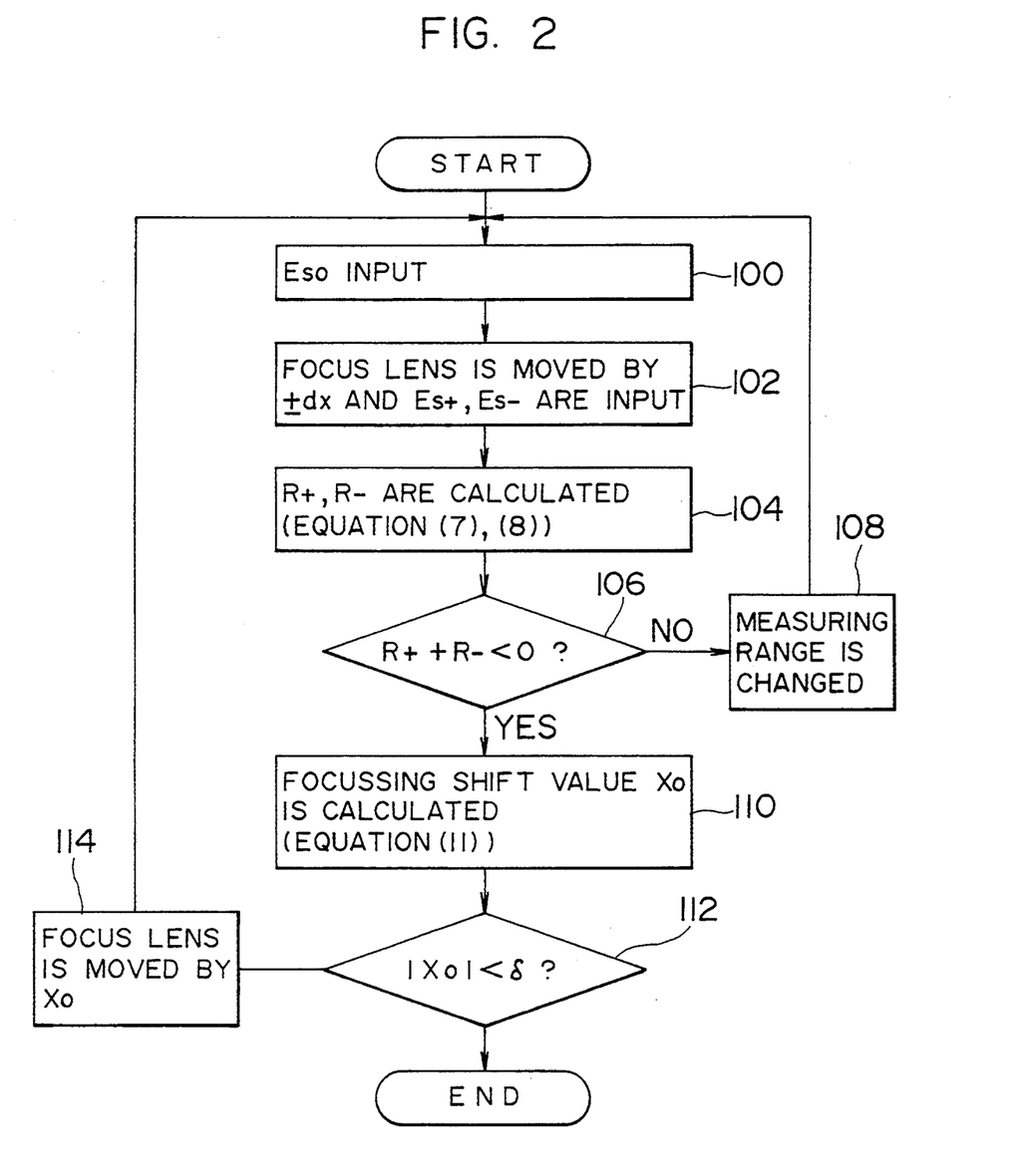
FIG. 2 is a flow chart for explaining the action of the operational process circuit shown in FIG. 1.

Operation of the operational process circuit 20 will hereunder be described with reference to the flow chart shown in FIG. 2.

First, the focus voltage $E_{S0}$ in the current moving position of the rear group lens 10B (hereinafter referred to as a "focus lens") is input into the operational process circuit 20 (Step 100), subsequently, the focus lens is moved by a minute distance dx in the front and the rear, and the focus voltages $E_{S+}$ and $E_{S-}$ at this time are input (Step 102).

Next, the input focus voltages $E_{S0}$, $E_{S+}$ and $E_{S-}$ are substituted into the above-described equations (7) and (8), whereby $R_+$ and $R_-$ are calculated (Step 104). Then, it is discriminated whether the sum of the thus calculated $R_+$ and $R_-$ is negative $(R_+ + R_- < 0)$ or not (Step 106).

When $(R_+ + R_-) \geq 0$, it is determined that there is an error in the measured value of the focus voltage. Therefore, the lens driving on the basis of such a measured value is not performed, a control signal is output into the gate circuit 42 to enlarge or reduce the measuring range (Step 108) and the process returns to Step 100.

When $(R_+ + R_-) < 0$, the process proceeds to Step 110, where the value of movement $X_0$ of the focus lens to the focussing position P (focussing shift value $X_0$) is calculated on the basis of the above-described equation (11). Then, it is discriminated whether this focussing shift value $X_0$ is within the allowable circle of confusion or not, i.e. the absolute value of $X_0$ is less than a radius $\delta$ of the circle of confusion $(X_0 < \delta)$ or not (Step 112).

When $X_0 \geq \delta$, it is determined that the non-focussing state remains, whereby the focus lens is moved by the calculated focussing shift value $X_0$ (Step 114), the process returns to Step 100 and the calculation of the focussing shift value and the like is performed again.

On the other hand, when $X_0 < \delta$, it is determined that the focussing state is present and auto-focussing is completed.

Incidentally, in this embodiment, when $(R_+ + R_-) \geq 0$, the measuring range has been changed, however, the invention should not necessarily be limited to this, and the passing zone in the BPF 44 may be changed or the focus lens may be moved in the front and the rear by a minute distance.

Figure 5:
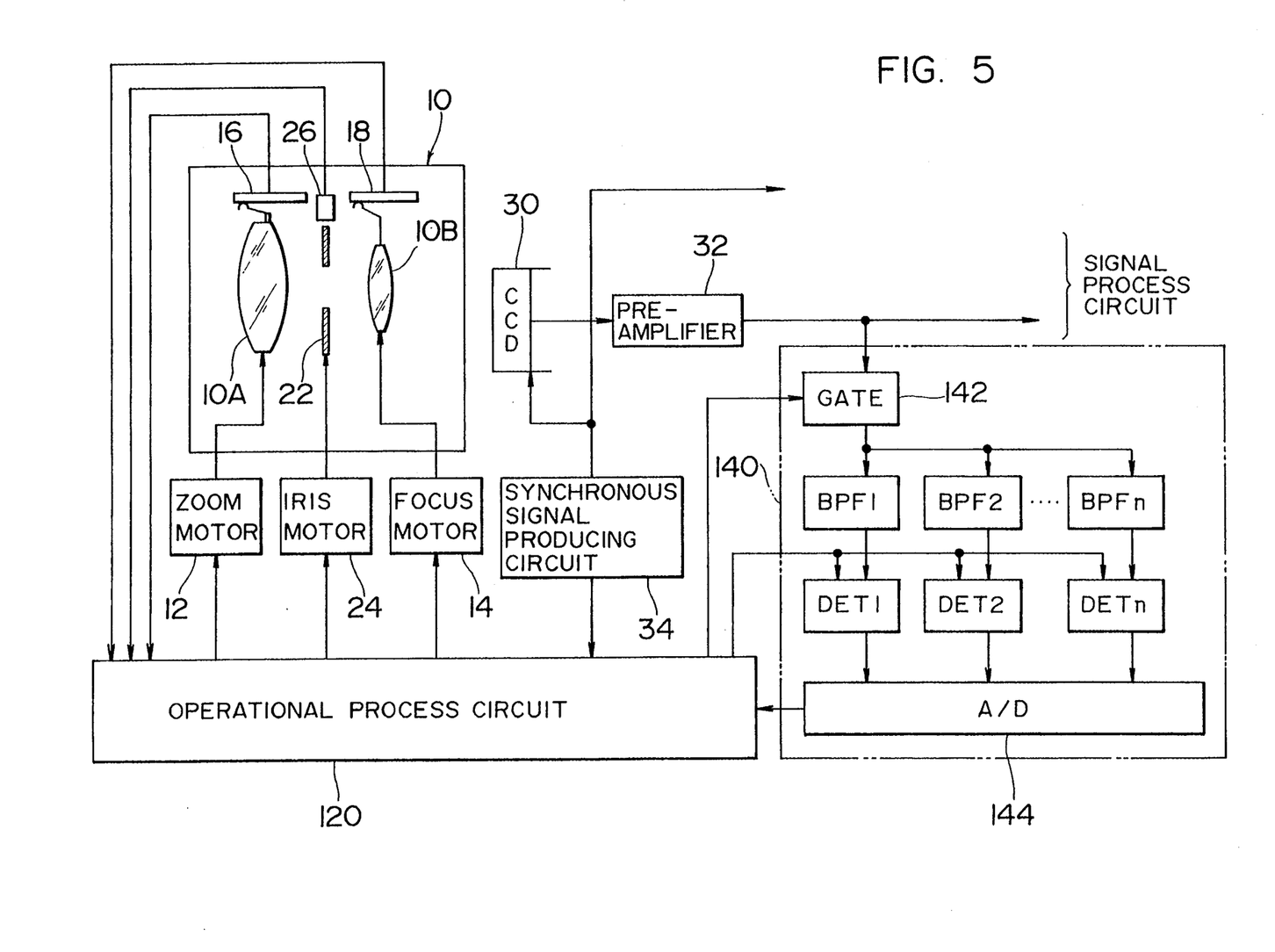
FIG. 5 is a block diagram showing another embodiment of the electronic camera provided with the system for the auto-focussing according to the present invention.

FIG. 5 is the block diagram showing another embodiment of the electronic camera provided with the system for auto-focussing according to the present invention. The same reference numerals designate the same or similar parts common with those in FIG. 1, so that detailed description will be omitted.

As shown in FIG. 5, in comparison of this electronic camera with the electronic camera shown in FIG. 1, an operational process circuit 120 an AF circuit 140 are different.

The AF circuit 140 includes a gate circuit 142, a total number n of band pass filters (BPF1, BPF2, ... BPFn), a total number n of focus voltage detecting circuits (DET1, DET2, ... DETn) and an A/D converter 144.

The gate circuit 142 allows only image signals within a predetermined measuring range out of the input image signals for one field to pass therethrough and, when signals showing the predetermined measuring range are input from an operational process circuit 120, the gate circuit 142 outputs the image signals to BPF1, BPF2, ... BPFn only during the inputting.

BPF1, BPF2, ... BPFn allow frequency components for respective high frequency zones different from one another out of the input image signals to pass therethrough and output these to DET1, DET2, ... DETn.

DET1, DET2, ... DETn are formed of detection circuits for example, and output voltage signals obtained by detecting signals of the input high frequency components as the focus voltages.

The total number n of the focus voltages thus detected are converted into digital signals by the A/D converter 144, and thereafter, output into the operational process circuit 120.

Figure 6:
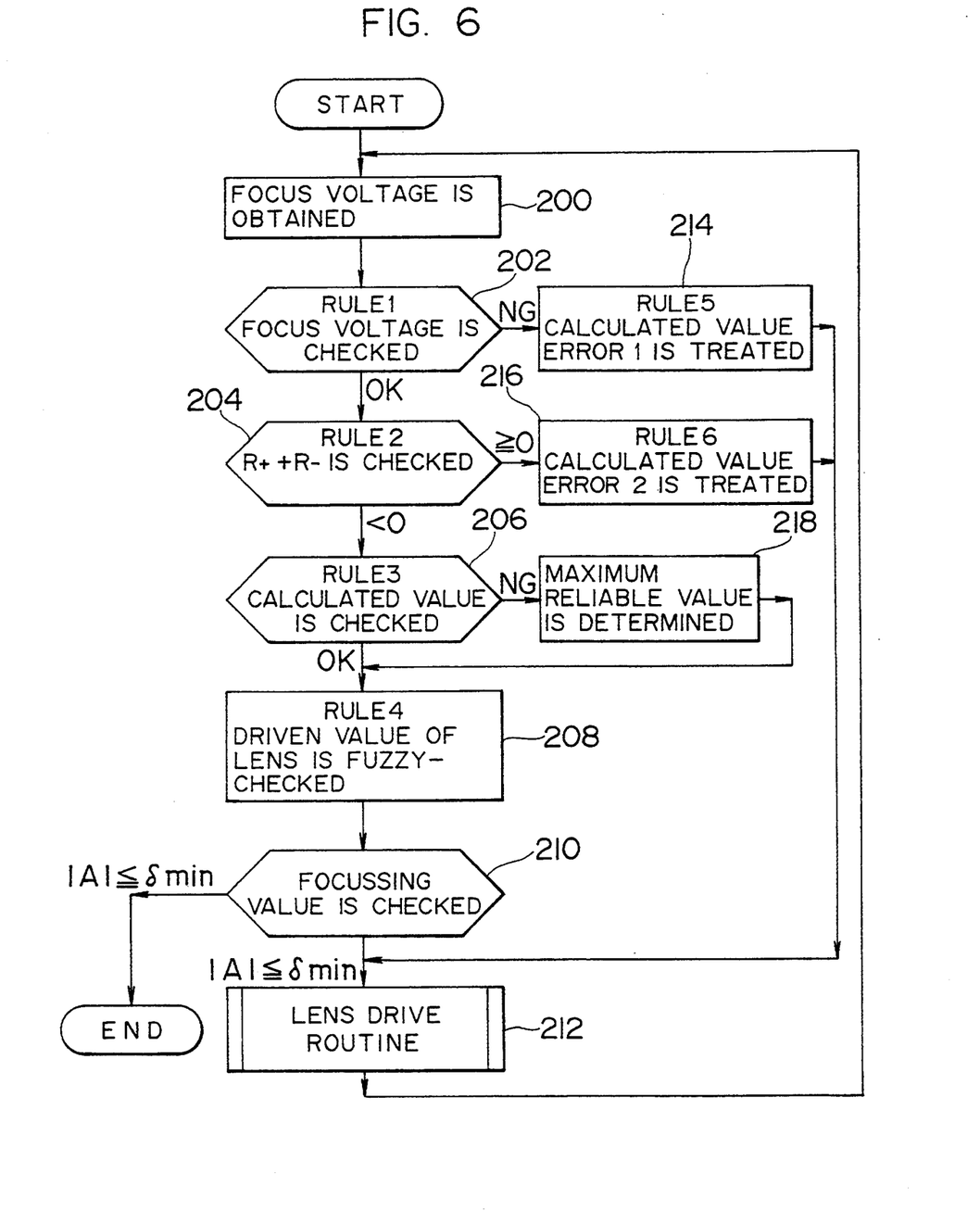
FIG. 6 is a flow chart used for explaining the action of the operational process circuit shown in FIG. 5.

Operation of the operational process circuit 120 will hereunder be described with reference to the flow chart shown in FIG. 6.

First, the total number n of focus voltages in the current moving position of the focus lens 10B are input into the operational process circuit 120 (Step 200).

Next, the focus voltages are checked in accordance with Rule 1 (Step 202).

Rule 1

[Checking of the focus voltages]

When the respective focus voltage values detected from the frequency components of the image signals which have passed through the respective BPF's are more than a predetermined value, Step 204 is performed, while, when less than the predetermined value, Step 214 is made to be performed.

In Step 204, checking of $R_+ + R_- < 0$ in accordance with Rule 2 is performed.

Rule 2

[Checking of $R_+ + R_- < 0$]

As apparent from the above-described equation (9), $(R_+ + R_-)$ constantly becomes negative, however, depending on the measured value of the focus voltage, there may be case where the measured value of $(R_+ + R_-)$ becomes positive. In this case, it is determined that there has been an error in the measured value of the focus voltage. Accordingly, when $R_+ + R_- < 0$, Step 206 is performed, while, when $R_+ + R_- \geq 0$, Step 216 is performed.

Step 206 checks the calculated value in accordance with Rule 3.

Rule 3

[Checking of the calculated value]

The value of movement of the focus lens to the focussing position P (focussing shift value) $X_0$ is calculated on the basis of the above-described equation (11). Incidentally, this focussing shift value $X_0$ is calculated for every focus voltage obtained through the respective BPF's.

Now, there are cases where the respective focussing shift values become values exceeding the values reliable values in the BPF's corresponding thereto. In Step 206, when the respective focussing shift values are the values included within the reliable values in BPF's corresponding thereto, the process proceeds to Step 208, and, when the focussing shift values become values exceeding the reliable values in the BPF's corresponding thereto, the process proceeds to Step 218, where the calculated value is corrected into predetermined value (the maximum value). Incidentally, the total number n of BPF's are set at 4, and examples between the types of BPF 1, 2, 3 and 4 and the maximum reliable values are shown in the following table.

TABLE 1

| Types of BPF | Maximum Reliable Values |
| --- | --- |
| BPF 1 | 200 μm |
| BPF 2 | 120 μm |
| BPF 3 | 90 μm |
| BPF 4 | 50 μm |

As shown in Table 1, when the focussing shift value calculated on the basis of the focus voltage detected through BPF 2 for example exceeds the maximum reliable value 120 μm, the focussing shift value is corrected to 120 μm, and, when the focussing shift value is less than the maximum reliable value 120 μm, the focussing shift value is adopted as it is.

In Step 208, the driving value of the lens is determined by the fuzzy inference in accordance with Rule 4.

Rule 4

[Determining the driving value by the fuzzy inference]

Three focussing shift values are obtained from the focus voltages detected through BPF 2, 3 and 4. Then, the fuzzy set is sought from these three focussing shift values and the membership functions and the fuzzy inference of determining the gravity of the set as the focussing shift value is performed.

Figure 7A:
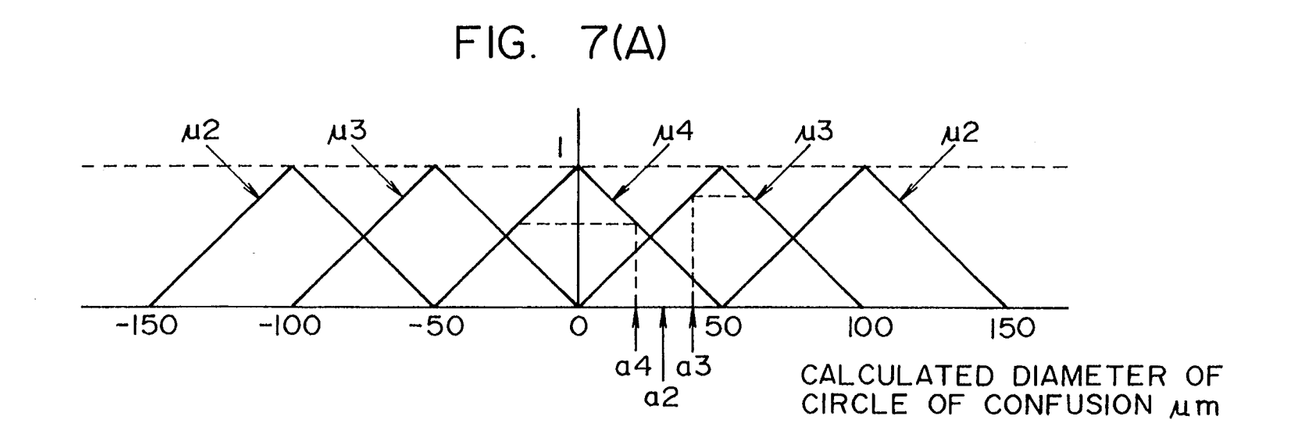
FIG. 7(A) is a chart showing an example of the membership characteristic functions corresponding to the respective BPF (Band Pass Filter) and the focussing shift values calculated from the respective BPF.
Figure 7B:
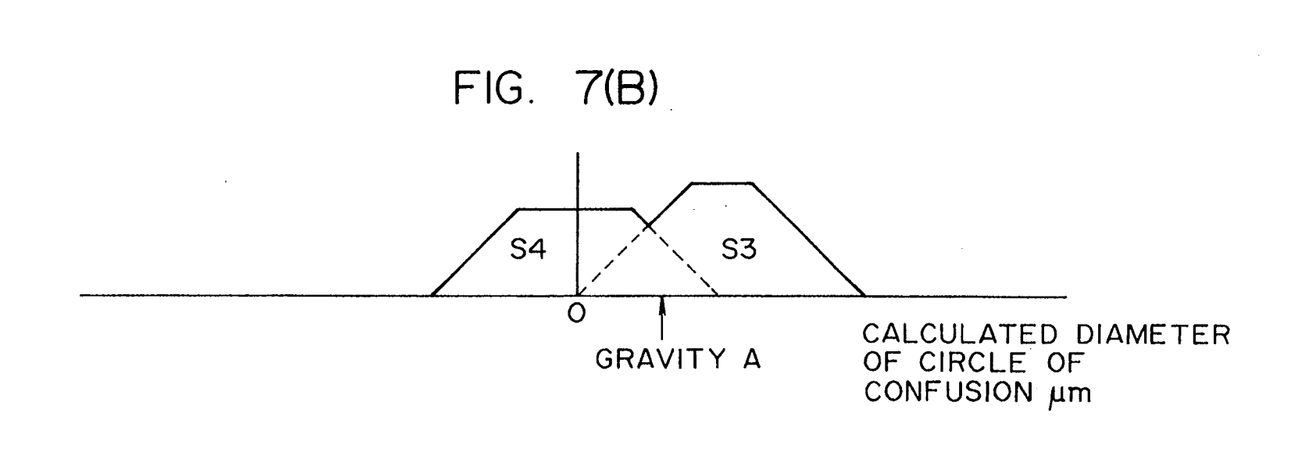
FIG. 7(B) is a chart showing the set of the membership characteristic functions as the result of inference.

That is, as shown in FIG. 7(A), the membership characteristic functions corresponding to BPF 2, 3 and 4 are made to be $\mu 2$, $\mu 3$ and $\mu 4$, respectively, and the focussing shift values calculated from the focus voltages detected through BPF 2, 3 and 4 are made to be a2, a3, and a4, respectively, whereby a fuzzy set S is sought by the following equation and a gravity A of this fuzzy set S is determined to be the focussing shift value (FIG. 7(B)).

$$S = (\ a2 \cap \mu 2) \cup (\ a3 \cap \mu 3) \cup (\ a4 \cap \mu 4) \quad (12)$$

Incidentally, if an area of the membership characteristic function as the result of inference obtained by the membership characteristic function $\mu 2$ and the focussing shift value a2 is made to be S2 and a gravity thereof A2, similarly, an area of the membership characteristic function as the result of inference obtained by the membership characteristic function $\mu 3$ and the focussing shift value a3 is made to be S3 and a gravity thereof A3, and further, an area of the membership characteristic function as the result of inference obtained by the membership characteristic function $\mu 4$ and the focussing shift value a4 is made to be S4 and a gravity thereof A4, the focussing shift value (gravity A) to be determined as described above can be calculated in accordance with the following equation:

$$A = (S2 \cdot A2 + S3 \cdot A3 + S4 \cdot A4)/(S2 + S3 + S4)$$

Then, in Step 210, the focussing is checked from the focussing shift value (gravity A) calculated as described above. That is, it is discriminated the focussing shift value thus calculated is included within the allowable circle of confusion or not, i.e., the absolute value of A is less than a radius $\delta$ min of the circle of confusion ($|A| \geq \delta$ min) or not, and, when $|A| \geq \delta$min, it is determined that focussing state stands, thus completing the action of auto-focussing.

On the other hand, when $|A| > \delta$ min, it is determined that non-focussing state stands, whereby the focus lens is driven by the calculated focussing shift value A (Step 212), the process returns to Step 200, and the calculation of the focussing shift value and the like is performed again.

Incidentally, when the focus voltage value detected in Step 202 is less than a predetermined value, it is conceived that the rate of erroneous components such as noises increases, which adversely affects the succeeding calculation process, whereby the process proceeds to Step 214, where a calculated value error 1 is treated by Rule 5.

Rule 5

[Treating the calculated value error 1]

This occurs when the inclination of the focus voltage cannot be detected by BPF1, and, in this case, search driving is performed in a certain direction.

Furthermore, in Step 204, when all of the calculated values sought in BPF2~4 are improper, the lens driving based on the calculated values becomes impossible, whereby, in this case, the process proceeds to Step 216, where a calculated value error 2 is treated by Rule 6.

Rule 6

[Treating the calculated value error 2]

In this case, the lens is driven by a unit delivery value in a direction corresponding to the inclination of the focus voltage detected by BPF1, whereby the focussing position is moved.

Incidentally, the method of calculating the focussing shift value on the basis of the focus voltage should not necessarily be limited to that in this embodiment, and various methods can be applied.

As has been described hereinabove, according to the method of auto-focussing and the system therefore of the present invention, the focus voltage when the part of optical system is in the optional position is made to be $E_{S0}$, the focus voltages when the part of optical system is moved by the minute distance in the front and the rear of the optional position are made to be $E_{S+}$ and $E_{S-}$, and the distance $X_0$ from the optional position to the focussing position is calculated by the equation (11) on the basis of these focus voltages $E_{S0}$, $E_{S+}$ and $E_{S-}$, whereby the distance $X_0$ can be sought without relying on the factors for determining the inclinations of the curves of the focus voltages and the magnitude of the width of differential, so that the focussing can be performed reliably and quickly. Furthermore, errors in the measurement of the focus voltage may be detected from the sign of $(R_+ + R_-)$ obtained during the calculation process.

Further, the respective frequency components for the plurality of the high frequency zones different from one another are extracted as the plurality of the focus voltages from the image signals obtained from the CCD, the distances for the part of optical system to move to the respective focussing positions are calculated on the basis of these plurality of focus voltages, the plurality of adaptations are determined from the plurality of distances to be moved, which have been calculated and a membership characteristic function using the plurality of high frequency zones as parameters, and the representative value of the set of these plurality of adaptations is calculated as the distance to the focussing position, whereby the distance to the focussing position can be correctly expected on the basis of the fuzzy inference, so that the focussing can be performed reliably and quickly.

It should be understood, however, that there is no intention to limit the invention to the specific forms disclosed, but on the contrary, the invention is to cover all modifications, alternate constructions and equivalents falling within the spirit and scope of the invention as expressed in the appended claims.

I claim:

1. A method of auto-focussing, wherein an object image is provided to an image sensor through an optical system, a high frequency component of image signals obtained from said image sensor is extracted, a focus voltage is detected from the high frequency component, a distance for a part of the optical system to move to a focussing position is calculated based on the focus voltage, and the part of the optical system is moved by the distance in an optical axis direction, so that the object image is focused at the image sensor, said method comprising the steps of:

(a) detecting a first focus voltage $E_{S0}$ when the part of the optical system is in an optional position;

(b) moving the part of the optical system by a distance dx in both a front and rear direction along the optical axis direction in relation to the optional position, and detecting a second focus voltage $E_{S+}$, and a third focus voltage $E_{S-}$, respectively;

(c) determining a distance $X_0$ from the optional position to the focussing position based on the first focus voltage $E_{S0}$, the second focus voltage $E_{S+}$ and the third focus voltage $E_{S-}$ according to:

$$X_0 = dx (R_+ - R_-) / 2 (R_+ + R_-)$$

where $R_+ = LN (E_{S+} / E_{S0})$ $R_- = LN (E_{S-} / E_{S0})$ 2 and (d) moving the part of the optical system by the distance $X_0$ in the optical axis direction, so that the object image is in focus.

2. The method of claim 1, wherein a sign of $(R_+ + R_-)$ is determined before the distance $X_0$ is calculated and said step (c) is performed only when the sign is negative.

3. The method of claim 2, wherein the high frequency component is extracted from the image signals within a predetermined measuring range, obtainable from said image sensor per picture image, and, when the sign of $(R_+ + R_-)$ is positive, said predetermined measuring range is changed.

4. The method of claim 2, wherein when the sign of $(R_+ + R_-)$ is positive, the part of the optical system is moved by the distance dx in the optical axis direction.

5. The method of claim 2, wherein when the sign of $(R_+ + R_-)$ is positive, a passing band for extracting the high frequency component from said image signals is changed.

6. A system for auto-focussing, comprising:

an optical system for providing an object image at an image sensor;

high frequency component extracting means for extracting a high frequency component from image signals obtained from said image sensor;

focus voltage detecting means for detecting a focus voltage from the high frequency component extracted by said high frequency component extracting means;

determining means for determining a distance $X_0$ from an optional position to a focusing position based on a first focus voltage $E_{S0}$ detected by said focus voltage detecting means when a part of the optical system is in the optional position, and a second focus voltage $E_{S+}$ and a third focus voltage $E_{S-}$, which are respectively detected by said focus voltage detecting means when the part of the optical system is moved by a distance dx in both a front and rear direction along the optical axis direction in relation to the optional position according to:

$$X_0 = dx\,(R_+ - R_-) / 2\,(R_+ + R_-)$$

where $R_+ = LN\,(E_{S+}/ E_{S0})$ $R_- = LN\,(E_{S-}/ E_{S0})$; and driving means for moving the part of the optical system the distance $X_0$ in the optical axis direction.

7. A method of auto-focussing, comprising the steps of:

(a) providing an object image to an image sensor through an optical system, and extracting respective high frequency components for a plurality of high frequency bands from image signals obtained from said image sensor;

(b) detecting a plurality of focus voltages from the respective high frequency components;

(c) determining a plurality of distances for a part of the optical system based on the plurality of focus voltages;

(d) determining a plurality of adaptations from the plurality of distances, determining a membership characteristic function using the plurality of high frequency bands as parameters, and setting a representative value of a set of the plurality of adaptations as a distance to a focussing position; and (e) moving the part of the optical system by the distance in an optical axis direction to focus the object image.

8. A method of auto-focussing, comprising the steps of:

(a) providing an object image to an image sensor through an optical system, and extracting a plurality of high frequency components from a plurality of high frequency bands from image signals obtained from said image sensor;

(b) detecting a plurality of focus voltages from the respective high frequency components;

(c) determining a plurality of distances for a part of the optical system based on the plurality of focus voltages;

(d) determining a plurality of membership characteristic functions from the plurality of distances and determining a membership characteristic function using the plurality of high frequency bands as parameters;

(e) setting gravity values of the plurality of membership characteristic functions at $Ai (i=1, 2 \ldots N)$, setting areas of the plurality of membership characteristic functions at $Si (i=1, 2 \ldots N)$, and determining a distance A to a focussing position according to:

$$A = \Sigma(Ai \times Si)/\Sigma\, Si, \text{ and}$$

(f) moving the part of the optical system by the distance A in an optical axis direction to focus the object image.

9. The method of claim 8, wherein, when the plurality of focus voltages obtained from the plurality of high frequency components are less than a predetermined value, respectively, the part of the optical system is moved by the distance A in the optical axis direction.

10. The method of claim 8, said step(c) including (c) (1) determining one of said plurality of voltages when the part of the optical system is in an optional position to be $E_{S0}$, (c) (2) determining two other of said plurality of focus voltages, when the part of the optical system is moved by distance dx in a front and rear direction from said optional position in said optical axis direction to be $E_{S+}$ and $E_{S-}$, and (c) (3) determining a distance $X_0$ from said optional position to a focussing position based on $E_{S0}$, $E_{S+}$, and $E_{S-}$ according to:

$$X_0 = dx\,(R_+ - R_-) / 2\,(R_+ + R_-)$$

where $R_+ = LN\,(E_{S+}/ E_{S0})$ $R_- = LN\,(E_{S-}/ E_{S0})$.

11. The method of claim 9, wherein a sign of $(R_+ + R_-)$ is determined and before said distance $X_0$ is determined and said distance $X_0$ is calculated only if the sign is negative.

12. The method of claim 11, wherein, when the sign of $(R_+ + R_-)$ is positive, an inclination of one of said plurality of focus voltages having a lowest high frequency component of said plurality of high frequency components is detected, and the part of the optical system is moved by the distance dx in a direction where the one of said plurality of focus voltages having the lowest high frequency component is increased based on said inclination.

13. A system for auto-focussing, comprising:

an optical system for providing an object image at an image sensor;

high frequency component extracting means for extracting a plurality of high frequency components for a plurality of high frequency components for a plurality of high frequency bands from image signals obtained from said image sensor;

focus voltage detecting means for detecting a plurality of focus voltages from the plurality of high frequency components, respectively extracted by said high frequency component extracting means;

first determining means for determining a plurality of distances based on the plurality of focus voltages detected by said focus voltage detecting means;

second determining means for determining a plurality of adaptations from the plurality of distances from said first determining means and a membership characteristic function using said plurality of high frequency bands as parameters, and a representative value of a set of said plurality of adaptations as a distance to a focussing position; and driving means for moving a part of the optical system the distance set by said second determining means in an optical axis direction.

14. A method of auto-focussing, comprising the steps of:
(a) receiving an image signal from an image sensor;
(b) detecting a high frequency component of the image signal;
(c) positioning a focussing lens at an optional position, along an optical axis and determining a focus voltage $E_{S0}$ at the optional position, from the high frequency component of the image signal;
(d) moving the focussing lens a distance dx from the optional position, in both a positive and negative direction, along the optical axis and determining focus voltages $E_{S+}$ and $E_{S-}$, respectively;
(e) determining a distance $X_0$ from the optional position to the focussing position, where:

$$X_0 = dx\,(R_+ - R_-)\,/\,2\,(R_+ + R_-)$$

$$R_+ = LN\,(E_{S+}/\,E_{S0}),\text{ and}$$

$$R_- = LN\,(E_{S-}/\,E_{S0})\text{ and}$$

(f) moving the focussing lens the distance $X_0$.

15. A system for auto-focussing, comprising:
receiving means for receiving an image signal from an image sensor;
detecting means for detecting a high frequency component of the image signal;
positioning means for positioning a focussing lens at an optional position, along an optical axis and determining a focus voltage $E_{S0}$ at the optional position, from the high frequency component of the image signal;
moving means for moving the focussing lens a distance dx from the optional position, in both a positive and negative direction, along the optical axis and determining focus voltages $E_{S+}$ and $E_{S-}$, respectively; and
determining means for determining a distance $X_0$ from the optional position to the focussing position, where:

$$X_0 = dx\,(R_+ - R_-)\,/\,2\,(R_+ + R_-),$$

$$R_+ = LN\,(E_{S+}/\,E_{S0}),\text{ and}$$

$$R_- = LN\,(E_{S-}/\,E_{S0}),$$

said moving means moving the focussing lens the distance $X_0$.

16. A method of auto-focussing, comprising the steps of:
(a) receiving an image signal from an image sensor;
(b) detecting a high frequency component of the image signal;
(c) positioning a focussing lens at an optional position, along an optical axis and determining a focus voltage $E_{S0}$ at the optional position, from the high frequency component of the image signal;
(d) moving the focussing lens a distance dx from the optional position, in both a positive and negative direction, along the optical axis and determining focus voltages $E_{S+}$ and $E_{S-}$, respectively;
(e) determining values $R_+$ and $R_-$, where $$R_+ = LN\,(E_{S+}/\,E_{S0});\text{ and}$$

$$R_- = LN(E_{S-}/\,E_{S0}),$$

(f) determining a distance $X_0$ from the optional position to the focussing position only if $(R_+ + R_-) < 0$, where:

$$X_0 = dx\,(R_+ - R_-)\,/2(R_+ + R_-);\text{ and}$$

(f) moving the focussing lens the distance $X_0$ only if $(R_+ + R_-) < 0$.

17. The method of claim 16, further comprising the step of:
(g) modifying a measuring range of the image signal and repeating steps (b)-(f) with the modified measuring range, when $(R_+ + R_-) \geq 0$.

18. The method of claim 16, further comprising the step of:
(g) modifying a passing band of the high frequency component of the image signal and repeating steps (b)-(f) with the modified passing band, when $(R_+ + R_-) \geq 0$.

19. The method of claim 16, further comprising the step of:
(g) moving the focussing lens the distance dx along the optical axis to modify the optional position and repeating steps (b)-(f) with the modified optional position, when $(R_+ + R_-) \geq 0$.

20. The method of claim 16, wherein step (f), the focussing lens is moved the distance $X_0$ only if the distance $X_0$ is greater than or equal to a circle of confusion.

21. A system for auto-focussing, comprising:
receiving means for receiving an image signal from an image sensor;
detecting means for detecting a high frequency component of the image signal;
positioning means for positioning a focussing lens at an optional position, along an optical axis and determining a focus voltage $E_{S0}$ at the optional position, from the high frequency component of the image signal;
moving means for moving the focussing lens a distance dx from the optional position, in both a positive and negative direction, along the optical axis and determining focus voltages $E_{S+}$ and $E_{S-}$, respectively; and
determining means for determining values $R_+$ and $R_-$, where $R_+ = LN(E_{S+}/ E_{S0})$, and $R_- = LN(E_{S-}/ E_{S0})$;

said determining means further determining a distance $X_0$ from the optional position to the focussing position only if $(R_+ + R_-) < 0$, where:

$X_0 = dx(R_+ - R_-) / 2(R_+ + R_-)$;

said moving means moving the focussing lens the distance $X_0$ only if $(R_+ + R_-) < 0$.

22. The system of claim 21, wherein said determining means modifies a measuring range of the image signal when $(R_+ + R_-) \geq 0$.

23. The system of claim 21, wherein said determining means modifies a passing band of the high frequency component of the image signal when $(R_+ + R_-) \geq 0$.

24. The system of claim 21, wherein said moving means moves the focussing lens the distance dx along the optical axis to modify the optional position when $(R_+ + R_-) \geq 0$.

25. The system of claim 21, wherein said moving means moves the focussing lens the distance $X_0$ only if the distance $X_0$ is greater than or equal to a circle of confusion.

26. An electronic camera, comprising:
image means for receiving a image signal;
auto-focussing means for positioning a focussing lens at an optional position, along an optical axis, determining a focus voltage $E_{S0}$ at the optional position, from a high frequency component of the image signal, moving the focussing lens a distance dx from the optional position, in both a positive and negative direction, along the optical axis and determining focus voltages $E_{S+}$ and $E_{S-}$, respectively, and determining a distance $X_0$ from the optional position to the focussing position, where:

$X_0 = dx(R_+ - R_-) / 2(R_+ + R_-)$, $R_+ = LN(E_{S+}/ E_{S0})$, and $R_- = LN(E_{S-}/ E_{S0})$, said auto-focussing means moving the focussing lens the distance $X_0$.

27. The electronic camera of claim 26, said auto-focussing means including,
gate circuit means for selecting a portion of the image signal within a predetermined measuring range for one field,
band pass filtering means for detecting the high frequency component of the portion of the image signal selected by said gate circuit means,
focus voltage detecting means for positioning the focussing lens at the optional position, along the optical axis, determining the focus voltage $E_{S0}$ at the optional position, from the high frequency component of the image signal, moving the focussing lens the distance dx from the optional position, in both the positive and negative direction, along the optical axis and determining the focus voltages $E_{S+}$ and $E_{S-}$, respectively, and determining the distance $X_0$ from the optional position to the focussing position, where:

$X_0 = dx(R_+ - R_-) / 2(R_+ + R_-)$, $R_+ = LN(E_{S+}/ E_{S0})$, and $R_- = LN(E_{S-}/ E_{S0})$, and A/D converting means for converting an analog signal representing the distance $X_0$ to a digital signal.

28. The electronic camera of claim 27, said image means including,
lens means, including the focussing lens, for passing and focussing light from an object image, and
image sensor means for converting the light from the object image to the image signal,
said electronic camera further comprising:
operational processing means for receiving the digital signal from said A/D converting means and adjusting said lens means in accordance with the digital signal.

29. An electronic camera, comprising:
image means for receiving a image signal; and
auto-focussing means for positioning a focussing lens at an optional position, along an optical axis, determining a focus voltage $E_{S0}$ at the optional position, from a high frequency component of the image signal, moving the focussing lens a distance dx from the optional position, in both a positive and negative direction, along the optical axis and determining focus voltages $E_{S+}$ and $E_{S-}$, respectively, and determining values $R_+$ and $R_-$, where $R_+ = LN(E_{S+}/ E_{S0})$, and $R_- = LN(E_{S-}/ E_{S0})$;

said auto-focussing means further determining a distance $X_0$ from the optional position to the focussing position only if $(R_+ + R_-) < 0$, where:

$X_0 = dx(R_+ - R_-) / 2(R_+ + R_-)$;

said auto-focussing means further moving the focussing lens the distance $X_0$ only if $(R_+ + R_-) < 0$.

30. The electronic camera of claim 29, wherein said auto-focussing means modifies a measuring range of the image signal when $(R_+ + R_-) \geq 0$.

31. The electronic camera of claim 29, wherein said auto-focussing means modifies a passing band of the high frequency component of the image signal when $(R_+ + R_-) \geq 0$.

32. The electronic camera of claim 29, wherein said auto-focusing means moves the focussing lens the distance dx along the optical axis to modify the optional position when $(R_+ + R_-) \geq 0$.

33. The electronic camera of claim 29, said auto-focussing means including,
gate circuit means for selecting a portion of the image signal within a predetermined measuring range for one field,
band pass filtering means for detecting the high frequency component of the portion of the image signal selected by said gate circuit means,
focus voltage detecting means for positioning the focussing lens at the optional position, along the optical axis, determining the focus voltage $E_{S0}$ at the optional position, from the high frequency component of the image signal, moving the focussing lens the distance dx from the optional position, in both the positive and negative direction, along the optical axis and determining the focus voltages $E_{S+}$ and $E_{S-}$, respectively, and determining the values $R_+$ and $R_-$, where $$R_+ = LN(E_{S+}/E_{S0}), \text{ and}$$

$$R_- = LN(E_{S-}/E_{S0}),$$

said focus voltage detecting means further determining the distance $X_0$ from the optional position to the focussing position only if $(R_+ + R_-) < 0$, where:

$$X_0 = dx(R_+ - R_-)/2(R_+ + R_-), \text{ and}$$

A/D converting means for converting an analog signal representing the distance $X_0$ to a digital signal.

34. The electronic camera of claim 33, said image means including,
    lens means, including the focussing lens, for passing and focussing light from an object image, and
    image sensor means for converting the light from the object image to the image signal,
said electronic camera further comprising:
    operational processing means for receiving the digital signal from said A/D converting means and adjusting said lens means in accordance with the digital signal.

35. The electronic camera of claim 29, wherein said auto-focussing means moves the focussing lens the distance $X_0$ only if the distance $X_0$ is greater than or equal to a circle of confusion.

* * * * *